(12) United States Patent
Stanic (10) Patent No.: US 8,455,152 B2
(45) Date of Patent: Jun. 4, 2013

(54) INTEGRATED PEM FUEL CELL (75) Inventor: Vesna Stanic, West Palm Beach, FL (US)

(73) Assignee: EnerFuel, Inc., West Palm Beach, FL (US)

( * ) Notice: Subject to any disclaimer, the term of this patent is extended or adjusted under 35 U.S.C. 154(b) by 654 days.

(21) Appl. No.: 12/603,655

(22) Filed: Oct. 22, 2009

(65) Prior Publication Data

US 2011/0097643 A1    Apr. 28, 2011

(51) Int. Cl.
*H01M 8/10* (2006.01)

(52) U.S. Cl.
USPC ........................................................ 429/483

(58) Field of Classification Search
USPC ........................................................ 429/518
See application file for complete search history.

(56) References Cited

U.S. PATENT DOCUMENTS

| | | | | |
|---|---|---|---|---|
| 4,197,178 | A | * | 4/1980 | Pellegri et al. ................ 204/255 |
| 5,906,898 | A | * | 5/1999 | Pondo ............................ 429/429 |
| 6,080,504 | A | * | 6/2000 | Taylor et al. ................... 429/481 |
| 6,511,766 | B1 | * | 1/2003 | Loutfy et al. .................. 429/454 |
| 2002/0004156 | A1 | * | 1/2002 | Mizuno ............................ 429/34 |
| 2004/0096725 | A1 | * | 5/2004 | Mao et al. ........................ 429/38 |
| 2006/0105232 | A1 | * | 5/2006 | Tanuma ......................... 429/129 |
| 2007/0108422 | A1 | * | 5/2007 | Horiuchi et al. .............. 252/500 |
| 2008/0096094 | A1 | | 4/2008 | Nakanishi |

FOREIGN PATENT DOCUMENTS

| | | |
|---|---|---|
| FR | 2857163 | 1/2005 |
| FR | 2888047 | 1/2007 |
| FR | 2888048 | 1/2007 |

OTHER PUBLICATIONS

International Search Report and Written Opinion mailed Mar. 9, 2011 in International Application No. PCT/US2010/053835.

* cited by examiner

*Primary Examiner* — Ula C Ruddock
*Assistant Examiner* — Scott J Chmielecki
(74) *Attorney, Agent, or Firm* — Armstrong Teasdale LLP (57) ABSTRACT An integrated PEM fuel cell includes bipolar plate assemblies that utilize fiber groups that extend from the surfaces of gas impermeable plates to terminate in uncoated tips facing adjacent tips to form anodes and cathodes of an MEA assembly. The catalyst support and catalyst can be applied to the tips as beads or thin layers and joined with a membrane. The assembly can use a unified seal and include collector plates at the ends of the stacks, using similar fiber construction.

17 Claims, 10 Drawing Sheets

INTEGRATED PEM FUEL CELL

FIELD OF THE INVENTION

The invention relates to the design, materials, and processing of fuel bipolar plates, the microstructure of fuel cell gas diffusion layer design, catalyst and catalyst support, proton exchange membrane and the integration of components into a single cell and multiple cell stack.

BACKGROUND TO THE INVENTION

In the current PEM fuel cell state of the art, the bipolar plate—MEA electrical contact occurs via a gas diffusion layer. Typically, the GDL is a two layer composite material that consists of a woven or non woven material coated with a porous carbon powder-polymer mixture (MDL). When assembled in a fuel cell, the carbon fiber material faces the bipolar plate surface while the MDL faces an electrocatalyst layer of MEA. The main function of GDL is to uniformly distribute the reactants and electrons across the entire MEA surface, and to manage the liquid water in the catalyst layer. Because of the non optimized design, its role is very limited and unpredictable. As a result of the GDL dysfunctional operation, PEM fuel cells may have high performance loss and a short life. One of the main reasons for the non uniform operation is compressive force imposed on the GDL that is induced on fuel cell in order to increase the interfacial electrical contacts within its components and the GDL conductivity itself. Carbon fiber layers that are aligned in x-y plane of the GDL must be under constant force to minimize the electrical resistance. This compression is the highest at the areas where the lands of the anode and cathode bipolar plates overlap and the lowest in the areas where their flow channels intersect. Thus, the electrical conductivity of GDL is the highest in the areas that are in contact with lands and lowest above flow channels. Compression in turn has the opposite effects on reactant flow distribution and water management porous media. In the area with the highest compression the flow is the lowest since the pores in GDL lessen under force; however, at no or low compression spots, the pores stay unchanged allowing reactant to freely pass to MEA. Consequently, the highest current density is generated in the most active areas of MEA that are the edges of lands since they have both the highest concentration of reactant and the highest electrical conductivity. In addition, the capillary action of the GDL that manages liquid water at the catalyst layer is also affected with the change of the pore size. The pores under compression that decrease and get irregular geometry under compression will start to accumulate water and loose the water managing ability. Therefore, the combined effects of non uniform electrochemical and mechanical stresses will create overloaded areas in the polymer electrolyte membrane and lead to its premature failure. The present invention addresses and eliminates these deficiencies with a novel approach.

Three layer MEAs used in low (LT) or high temperature (HT) PEM fuel cells consist of ion exchange membrane with anode and cathode catalyst layers coated on the opposing faces. The active catalyst area of MEA is typically surrounded with uncoated membrane used to seal fuel cell. In the current state of the art of LT or HT technology, the main components of catalyst coating are platinum catalyst (Pt) supported on carbon powder (Pt/C) and ion exchange polymer. Typically, the polymer is as same as the one used for making membrane. The coating is usually made by mixing the components into ink that is then applied onto a membrane surface using standard techniques well known in thin film technology. For any type of PEM hydrogen/air fuel cell, typical Pt loading for combined anode and cathode electrodes is a minimum 0.6 mg/cm2. This catalyst amount when applied as a coating has only 30% electrochemically accessible surface area in comparison to the Pt/C catalyst powder. Yet, during operation, the initial catalyst surface area further decreases to ~10% due to the Pt particle growth via dissolution and recrystallization, and agglomeration. Therefore, the catalyst amount deposited in MEAs can decrease by 90% if the way of the catalyst deposition is optimized. The main benefits of such advancement would be the MEA cost reduction. Numerous analyses predict that the Pt cost will predominate in the MEA cost even in their mass market production mode.

Proton conducting membranes used in current PEM fuel cell technology are made of acid based polymers. For instance, sulfonated poly tetra fluoro ethylene (PTFE) polymer known under brand name Nafion® is typically used for LT fuel cells while phosphoric acid doped poly benzyl imidazol (PBI) employed in Celtec® MEAs is used for HT fuel cells. Proton conductivity in competing LT and HT membranes are liquid media dependant. Vehicle type proton conductivity mechanism of Nafion® is enabled by the presence of liquid water in the membrane. High and low contents of water force Nafion® to swell and shrink, inducing mechanical stresses that result in premature membrane failure. In addition, absorbed water works as polymer plasticizer that increases the membrane creep especially at higher temperatures. Consequently, the membrane failure occurs at much faster rates as a result of the accelerated creep. Even though the proton conductivity in the HT membrane occurs via different mechanism (Grotthuss) it is still liquid dependant. In this membrane proton conductance occurs via intermolecular proton transfer within a dynamical hydrogen bond network formed by the association and dissociation of the phosphoric acid molecules. As highly hydrophilic, phosphoric acid constantly absorbs water from air. Diluted acid migrates out of the membrane, clogs gas pores and channels, and reacts chemically with metal catalyst. All these changes ultimately limit the HT MEA life and make the HT fuel cells extremely sensitive to the presence of liquid water.

SUMMARY OF THE INVENTION

According to aspects of the invention, an integrated PEM fuel cell includes at least two bipolar plate assemblies, each including a gas impermeable plate and multiple unidirectional electrically conductive fibers, each fiber having a first anode end and a second cathode end. The fibers are grouped in longitudinal bundles extending perpendicular to the plate, with the anode ends on one side of the plate and the cathode ends on the other side of the plate. Each of the bundles is coated in a gas impermeable coating. The coating extends from the plate towards each of the fiber ends, and a portion of the fibers adjacent the ends remains uncoated. The fiber end portions transition to uncoated fiber brushes presenting fiber tips. The anode side of one of the bipolar plate assemblies faces the cathode side of another bipolar plate assembly.

The fuel cell further includes a membrane electrode assembly having an anode catalyst support located on fiber tips of the anode fiber ends and an anode catalyst located on the anode catalyst support. A cathode catalyst support is located on fiber tips of the cathode fiber ends and a cathode catalyst located on the cathode catalyst support. A proton exchange membrane interconnects the cathode catalyst support and the anode catalyst support.

The anode catalyst support and the cathode catalyst support can each be an ion exchange polymer with catalyst cations exchanged for protons. The anode catalyst support and the cathode catalyst support can each be formed as droplets or a thin coating on the fiber ends.

The proton exchange membrane can be formed as an ion exchange polymer placed on the catalyst support on the fiber ends, and the electrocatalyst can be placed on the surface of the catalyst support droplets or thin coating by a reduction of the surface cations in the catalyst support.

The fiber bundles can be arranged in a matrix to define a fuel flow field on one side of the plate and an oxidant flow field on the other side of the plate.

The fuel cell can further include collector plate assemblies, including a conductive plate for electrically connecting to an anode end of one of the bipolar plate assemblies; and a second conductive plate for electrically connecting to a cathode end of another of the bipolar plate assemblies. The plates can be constructed of conductive resin.

The fiber bundles of each bipolar plate assembly can be intersected by and connected to an electrically conductive substrate positioned within the bipolar plate. Alternatively, the fibers extending through each bipolar plate can be separated by the substrate into anode fibers and cathode fibers. At least some of the anode fibers can be axially offset relative to cathode fibers. The substrate can extend beyond the periphery of the bipolar plate, thereby providing edge cooling.

According to other aspects of the invention, the bipolar plate assemblies can include multiple electrically conductive fibers arranged in fiber groups, including anode fiber groups extending from the plate on an anode side and cathode fiber groups extending from the plate on an opposite cathode side. The fiber groups can be formed as fiber blocks including continuous fiber in an adhesive matrix making the block impermeable. These fiber blocks can be arranged to form flow paths for at least one of fuel and oxidant. The fiber blocks can also be arranged in a woven fabric. Alternatively, the fiber groups can be formed as velvet segments mounted to a substrate in each gas impermeable plate.

A fuel cell according to aspects of the invention can include fibers shaped as hooks extending from each bipolar plate assembly and fibers arranged as loops incorporated in each membrane electrode assembly.

The invention also provides a process for integrating a membrane electrode assembly with a bipolar plate in a fuel cell. The process can include the steps of:
  providing bipolar plate assemblies, each presenting fiber ends facing each other;
  depositing polymer droplets on tips of the bipolar plate fibers;
  drying the droplets to get polymer beads;
  depositing a continuous thin polymer layer over the polymer beads;
  exchanging protons in the polymer beads and continuous layer with catalyst cations to obtain a catalyst support;
  reducing surface cations to metal catalyst on the catalyst support;
  depositing a polymer to build a proton conductive membrane layer; and
  bonding the membrane layers formed on each of the facing groups of fiber end to each other.

BRIEF DESCRIPTION OF THE DRAWINGS

Other advantages of the present invention will be readily appreciated as the same becomes better understood by reference to the following detailed description when considered with the accompanying drawing herein.

DETAILED DESCRIPTION OF PREFERRED EMBODIMENTS

The invention encompasses a membrane electrode assembly (MEA) and bipolar plates integrated into an operable polymer electrolyte membrane (PEM) fuel cell.

Figure 1:
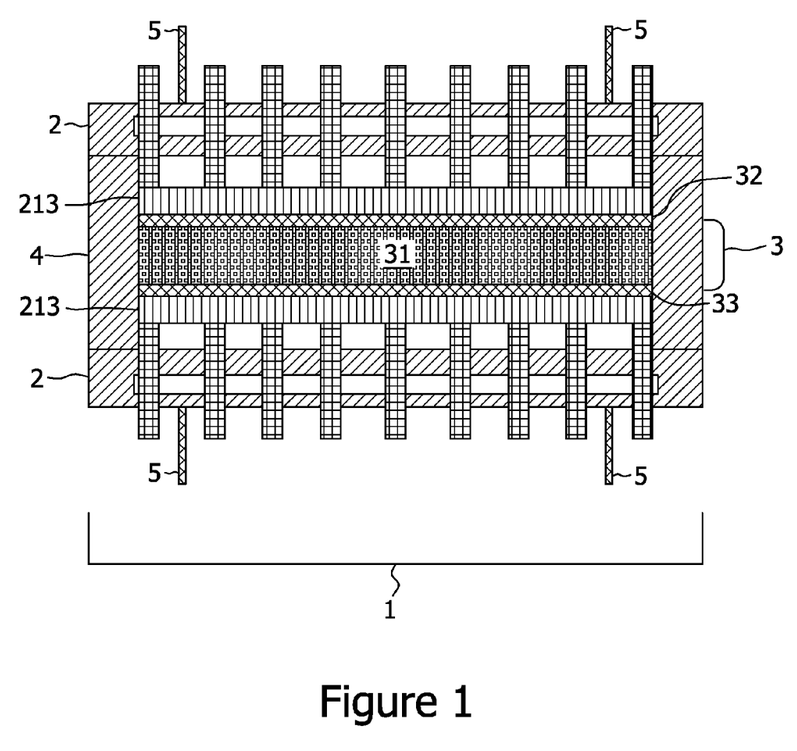
FIG. 1 is a side view of an integrated single fuel cell.
Figure 10:
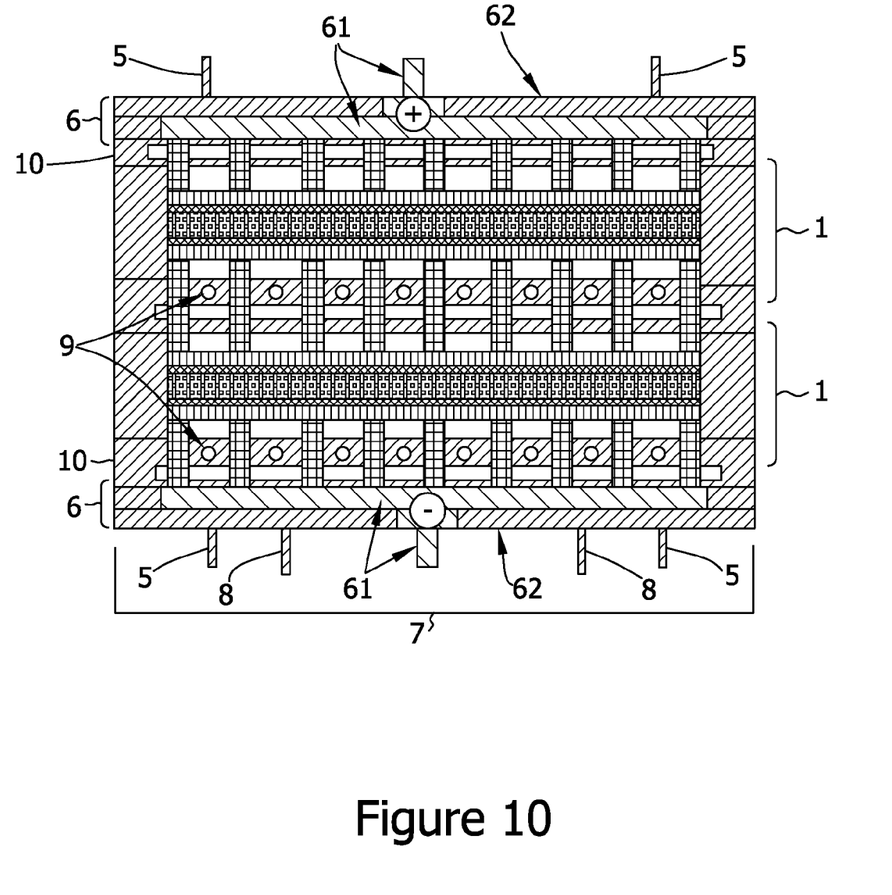
FIG. 10 is a side view of fuel cell stack that includes two integrated fuel cells.

An integrated single fuel cell (FC) 1 of the present invention is generally presented in FIG. 1. The cell 1 includes two bipolar plates 2 arranged in minor symmetry with respect to a membrane electrode assembly (MEA) 3, seal 4 and gas inlet and outlet ports 5. Catalyst support 213 is an integral part of a bipolar plate 2 and can be placed on both faces of a single bipolar plate 2. It further connects bipolar plates to anode 32 and cathode 33 catalyst layers attached to the membrane 31 opposing faces. Reactants, typically hydrogen and an oxidant, are supplied to and exhausted from the fuel cell 1 via inlet and outlet ports 5 located on the bipolar plates 2. The ports 5 may be manifolded internally or externally. The integrated single fuel cell can function as an electrochemical conversion device if current collector plates 6 are attached to external surfaces of end bipolar plates 10 (FIG. 10). A multiple fuel cell stack can also be made by integration of single cells 1 and finished by addition of current collector plates 6 to the end cells as shown in on the example of two cell stack presented in FIG. 10.

Figure 2:
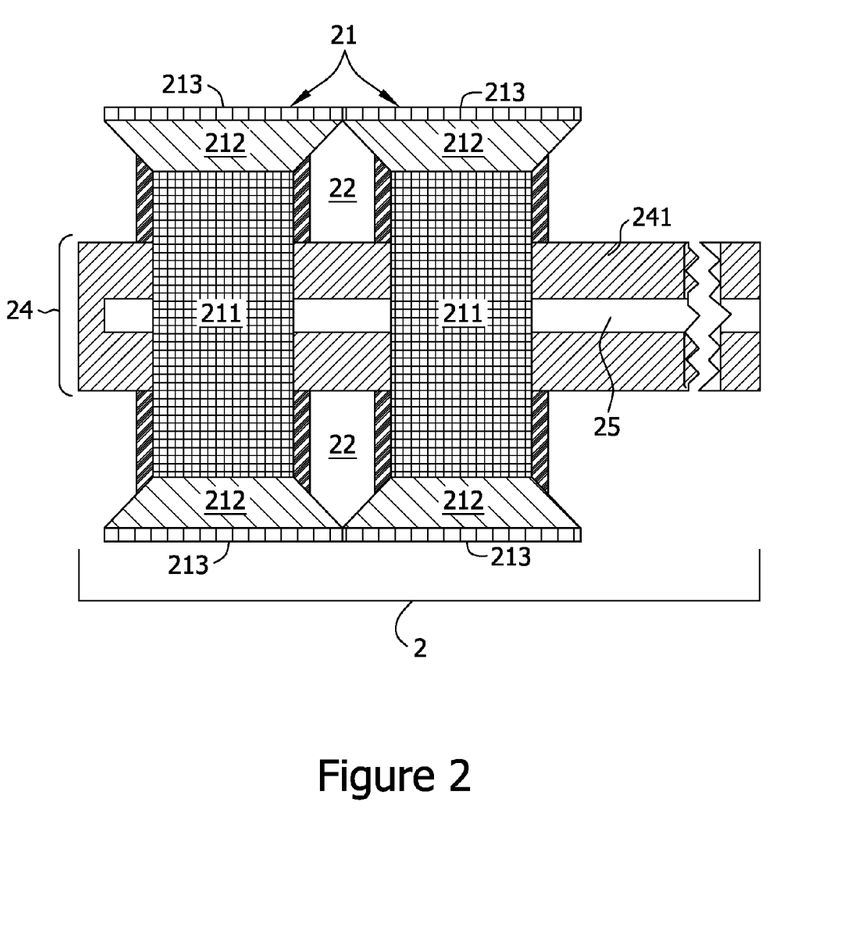
FIG. 2 is a detail of a side elevation view of the integrated bipolar plate.

A bipolar plate 2 is typically shared between two adjacent fuel cells. It indeed electrically connects anode and cathode of two cells. Thus, one face of the bipolar plate 2 is positively charged while the opposing face is negatively charged. It supplies and distributes reactants to the anode and cathode catalyst sites of the adjacent MEAs. However, the bipolar plate 2 creates a physical barrier against gas mixing. The positively charged surface of bipolar plate 2 introduces, distributes, and exhausts fuel with or without water vapor from the anode surface of one MEA, while the negatively charged side introduces, distributes, and exhausts oxidant with water vapor from the cathode surface of the second neighboring MEA 3 (not shown). In addition, the bipolar plate 2 may provide a structural support to mount other fuel cell components (GDL, MEA) on its opposing faces.

A detail of an integrated bipolar plate 2 shown in FIG. 2 illustrates one of the potential embodiments. Referring to FIG. 2, the integrated bipolar plate consists of a flat plate 24 with unidirectional electrically conductive fibers 21 aligned perpendicularly to the surface of the flat plate 24. The fibers 21 run continuously from one side of the flat plate 24 to the other. The fibers 21 embedded into a base material 241 of the flat plate 24 create the impermeable fiber layer 211. The upper part of the fibers 21 consists of loose fibers that make a compliant fiber brush 212. The electrochemical contact with MEA 3 practically occurs via integration of the brush 212 and the MEA 3 surface (FIG. 1).

In another embodiment, the fibers 21 may also be anchored to a substrate 25 as shown in FIG. 2. The substrate is electrically conductive and may be made of impermeable materials or materials with open structure. In an embodiment that includes a solid impermeable material, cathode and anode fibers are in electrical contact via the substrate 25. However, they may continuously run through the substrate when made from the open structure material. To make the bipolar plate 2 impermeable, both the fibers 21 and the substrate 25 are encapsulated with a base material 241. Flow field channels 22 in the bipolar plates 2 are formed to supply reactants and to take exhaust away from the fuel cell. By arranging fibers 21 in various configurations, bipolar plates 2 with different shapes may be produced.

Figure 3A:
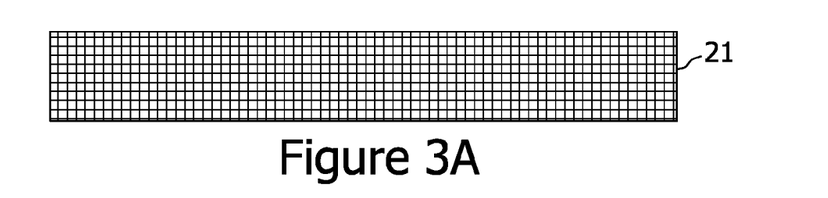
FIG. 3 is side elevation view of fiber arrangements: a) block; b) two-sided brush; c) velvet.
Figure 3B:
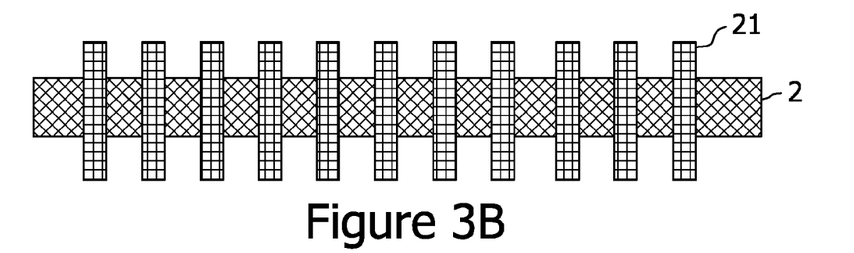
Figure 3C:
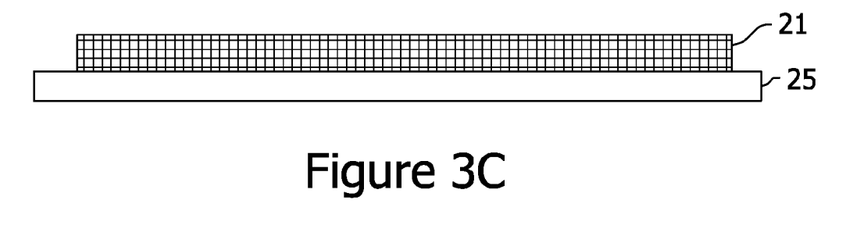
Figure 4:
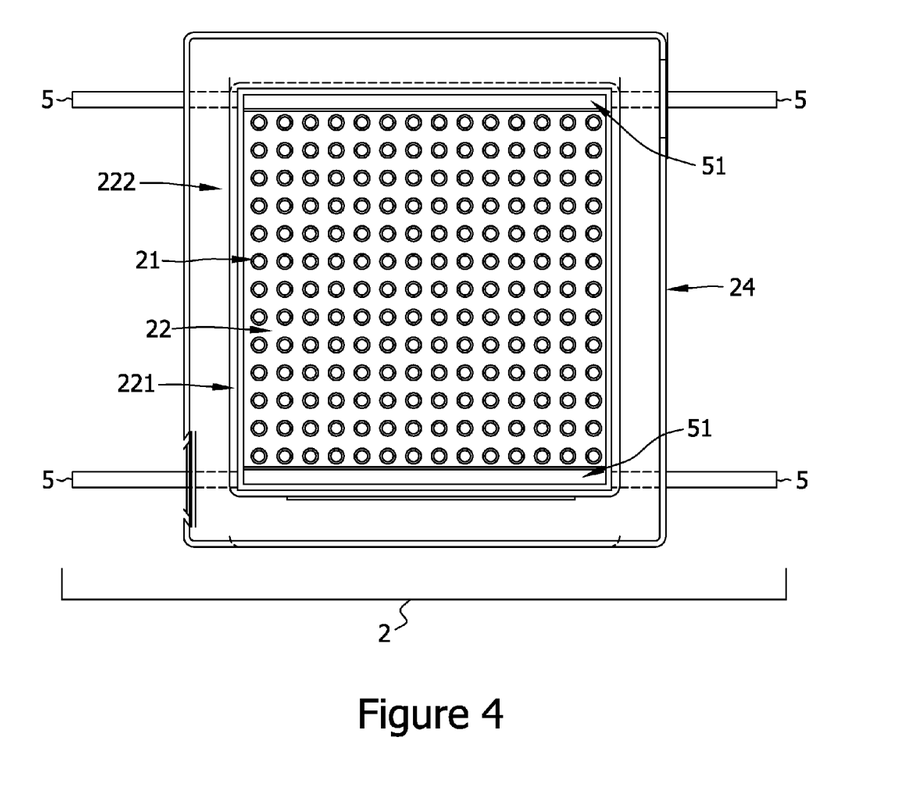
FIG. 4 is a top view of bipolar plate with fibers in two-sided brush configuration.

Referring to FIG. 3, some of the possible fiber 21 arrangements are shown. For example, the fibers 21 can be packed into 3-D blocks (FIG. 3a), brushes (FIG. 3b), or velvet 10 like configuration (FIG. 3c). Some of the fiber 21 configurations result in a ready to use bipolar plate 2 with flow field channels 22 already incorporated as it appears in FIG. 3b, where the fibers 21 are arranged into a two sided brush. However, additional fabrication steps are required to make a flow field from fiber blocks or velvets. Those skilled in the art will appreciate that various flow field types may be formed from fibers for distributing the reactants at the desired fluid flow properties. These flow fields include and are not limited to channels in different configurations, corrugated, porous or perforated plates, beam structures, or the like. As shown in FIG. 2, bipolar plate 2 has a two sided brush type embodiment where the fibers 21 run through a substrate continuously from one side of the flat plate 24 to the other. They are spaced at certain distance to form gas channels 22 with designed flow characteristics on both faces of the bipolar plate 2. The top view of the same bipolar plate 2 is shown in FIG. 4. This flow field 221 has a beam configuration. The flow field 221 is located in the inner region of the flat plate 24 and is surrounded with a flat perimeter 222. A reactant is supplied to or exhausted from the flow field 221 through the inlet/outlet ports 5. They may be located on the opposing corners of the flat plate 24 for the external reactant manifolding as shown in this particular embodiment. Two ports 5 on each face of the bipolar plate 2 interconnect the inner channels 51 with the outer fuel supply/exhaust plumbing (not shown). Elimination of the substrate 25 (shown in FIG. 2) will result in the same bipolar plate 2 embodiment produced from fibers 21 arranged in two sided brush configuration. Similar design of the bipolar plate 2 shown in FIG. 4 can also be made from a single sided brush design (not shown). In this case, the fibers 21 are symmetrically embedded into a base material 241 of a flat plate 24 touching the opposing faces of an electrically conductive substrate 25 placed in the middle of the plate 24 (FIG. 2). The fiber 21 main body and substrate 25 assembly is encapsulated, resulting in an impermeable bipolar plate 2. When a reactant enters into the channel 51 through the port 5, it is uniformly distributed across the face of the bipolar plate 2 through the crossed channeled flow field 221. In this flow field configuration, the embedded fibers 21 create impermeable fiber layers 211 in the form of fiber posts instead of the continuous layer. The brushes 212 at the top of the posts 211 support MEA 3 and make electrical connection with it.

In operation, fuel cells need to be cooled while producing electrical power in order to remove excess heat generated due to the intrinsic energy losses. In an open cathode design, air flow typically provides a dual role—it supplies oxidant and eliminates heat. However, in fuel cells where air cooling/heating is not applicable, some other types of heat regulation must be integrated in the bipolar plate 2. For instance, the electrically conductive substrate 25 can be used for edge cooling if exposed to the surrounding air by making it larger than the base material 241 of the flat plate 24. For liquid cooled systems, the base material 241 of the bipolar plate facing the cathode side may have liquid coolant channels 9 as presented in FIG. 10 that are encapsulated within the plate 24. The coolant flow field (not shown) in each bipolar plate 2 may be internally or externally manifolded to provide the continuous coolant flow through the stack.

A two sided brush type bipolar plate 2 can be produced by utilizing various processes known for the manufacturing of plastic brushes. They may include but are not limited to extrusion, injection molding, thermoforming, casting, compression molding, and transfer molding. For example, the bipolar plate 2 as shown in FIG. 2 can be produced to the final dimensions with all features as designed by molding process from precut and aligned fiber bundles 21 encapsulated in a polymer base material 241.

Blocks as shown in FIG. 3a are typically made of fibers treated with an adhesive/sealant that keeps them tightly bonded in an impermeable component. In a preferred embodiment, the continuous electrically conductive filaments may pass through an impregnation bath with polymer solution, melt, or resin before being compressed into a continuous fiber bundle to desired size and shape. The blocks with certain thickness are then cut from the bundles and used for making flow field 221. The complete bipolar plate 2 is then produced by incorporating a flat perimeter 222 with inlet/outlet feature 5 as shown in FIG. 4. Manufacturing processes used for making bipolar plates 2 from blocks include the methods used for the fabrication of polymer/fiber composites such as molding, extrusion, thermoforming, and casting.

In addition to the described method, the fiber block may also be produced from a plain weave fabric where electrically conductive fibers make warp that is attached with weft. The fabric is treated with an adhesive/sealant and layered into a compressed bundle with warp oriented in the same direction. Similarly to the blocks made from the continuous fibers, the blocks are cut from the cloth with a desired thickness for further processing.

Referring to FIG. 3c, single-sided velvet may be used as a bipolar plate 2 precursor. Two pieces of the material are used and assembled in such a way that the substrates 25 are in close contact with fibers facing outwards. The substrates 25 and fibers are then treated with a polymer used for making the base material 241 of the flat plate 24. The bipolar plate 2 flow field 221 features may be then incorporated via various manufacturing techniques that may include molding, casting, extrusion, thermoforming, etc. If necessary, a flat perimeter 222 may be added to the flow field 221 using these techniques as well. The velvet like materials may be produced by weaving, knitting, or tufting—the manufacturing techniques typically used in the textile industry for producing velvet, velour, and carpet, respectively. During weaving of corduroy type textile, flow field channel can be simultaneously made.

The materials for making the bipolar plate 2 as shown in FIG. 2 from precursors shown in FIG. 3 may include plastics such as thermoset or thermoplastic polymers, and polymer composites, and any kind of electrically conductive fibers, fiber bundles, and yarns. The fiber diameter may range from nanometer to tens of micrometers. The fiber and polymer selection is based on the resistance to the mechanical, thermal, and chemical stresses present in the operational fuel cell. In addition, an important factor for choosing proper materials is compatibility with the membrane material due to bonding. Preferably the polymer used for the bipolar plate is made of a polymer similar to the membrane or the adhesive materials. The fibers selected preferably have both extremely good electrical and thermal conductivities.

Figure 5:
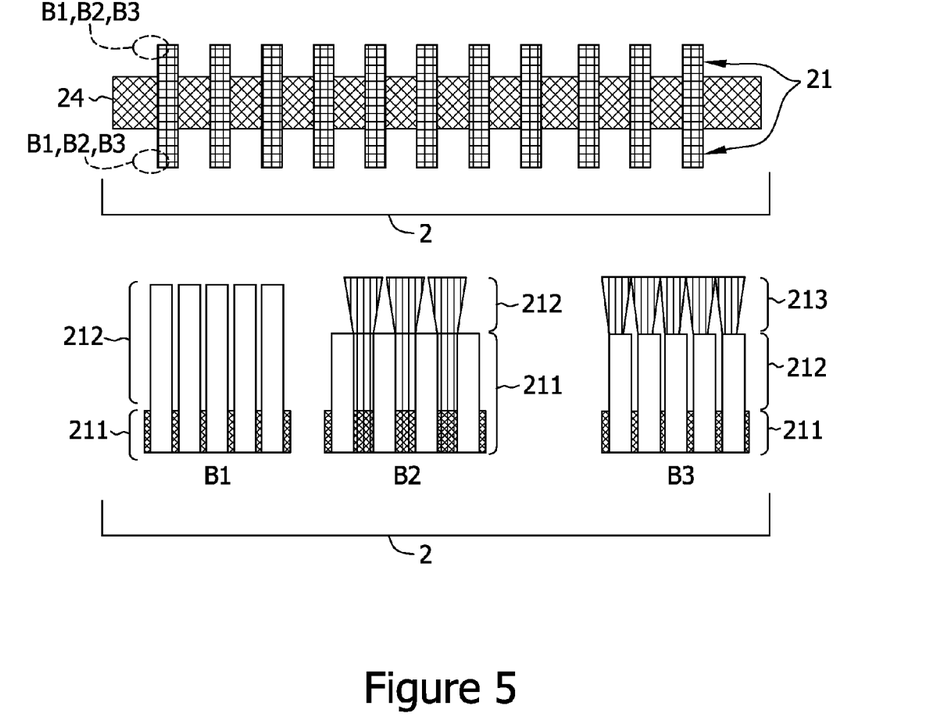
FIG. 5 is an exploded view of a bipolar plate that shows the details of a fiber surface in contact with an MEA.

FIG. 5 is an exploded view of a bipolar plate 2 that shows the details of fiber surface in contact with MEA (not shown). More specifically, encapsulated fiber layers 211 (in the form of fiber posts) are extended upwardly into fiber brushes 212 that interconnect the bipolar plate 2 with MEA. The fiber posts 211 and brushes 212 may have various embodiments as presented in FIG. 5. They may include but are not limited to the fibers with the same diameter (FIG. 5B1), or mixed fibers with micro and nano size diameters (FIG. 5B2). Bipolar plate 2 may also have an additional nanofiber layer 213 attached to brushes 212 (FIG. 5B3). The nano layer 213 may be added by various procedures that include but are not limited to chemical, electrochemical, mechanical, or electrostatic. The fiber posts 211, brushes 212 and nano layer 213 if present, create macro, and micro fluid passages analogous to the channels and GDLs in current fuel cell technology. As best shown in FIG. 2, the space between encapsulated, tightly compressed, and impermeable fiber posts 211 form flow channels 22 that gradually decrease between wide open fiber brushes 212. A plurality of micro fluid passages is defined and readily distributed within fibers that uniformly cover the entire MEA 3 surface thus having the GDL like function. However, the size of these micro channels in the brushes 212 is gradually increased from the fiber posts 211 towards the MEA 3 surface. This type of pore geometry may have enhanced capillary action for wicking liquid water from the MEA's surface towards the fiber posts 211. In addition, the fiber brushes 212 can easily adjust to compression thus creating a compliant layer that can accommodate compression or dimensional variations while still providing uniform fluid distribution and conductivity at the MEA 3.

Figure 6:
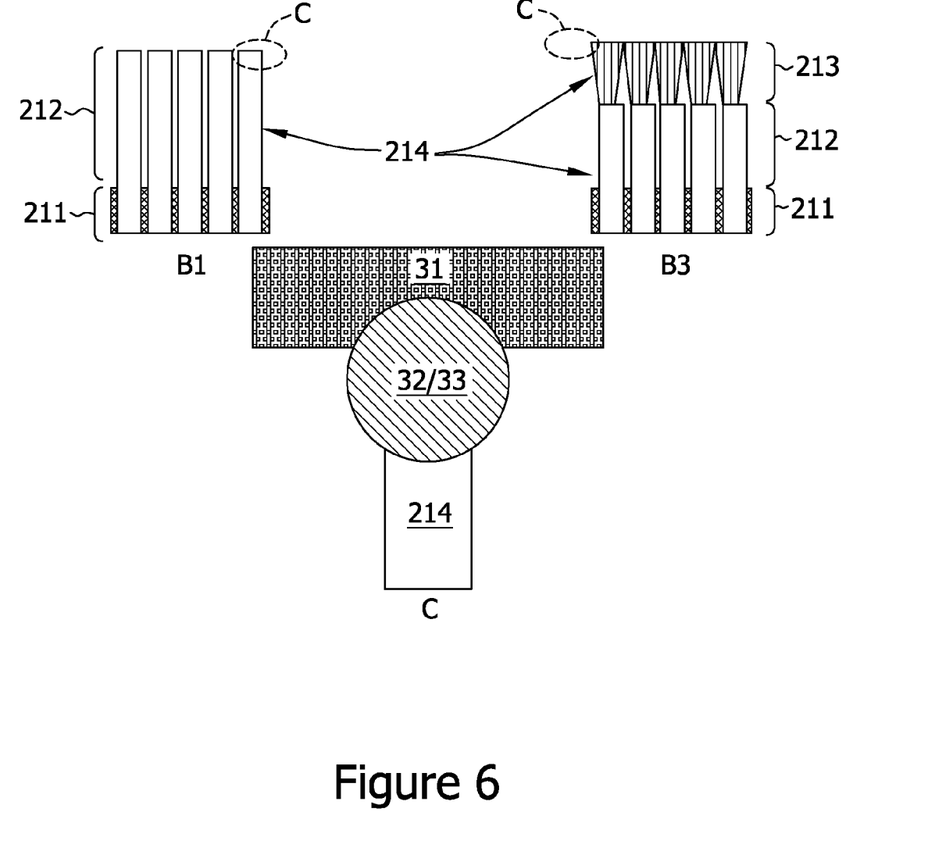
FIG. 6 is an exploded view of a tip of a fiber in a bipolar plate that shows the details of the bipolar plate and MEA integration.

The tips of the fibers of brushes 212 or nano layer 213 are further integrated into MEA 3. One of the ways is as a catalyst support. Referring to FIG. 6, the upper end of a fiber 214 that may be the main constituent of a brush 212 (B1) or nano layer 213 (B3) has at least one anode 32 or cathode 33 catalyst bead attached to it. Preferably, the catalyst bead 32/33 is then bonded to the membrane 31 during membrane processing. Various techniques such as solution casting, spraying, dip coating, spin coating, extrusion, melt casting, combination of any techniques, or some other process that will result in impermeable proton conductive membrane. When bonded, the fiber 214, the catalyst bead 32/33 and the membrane 31 form a multi phase boundary zone where gaseous reactants are able to convert electrochemically.

Figure 7A:
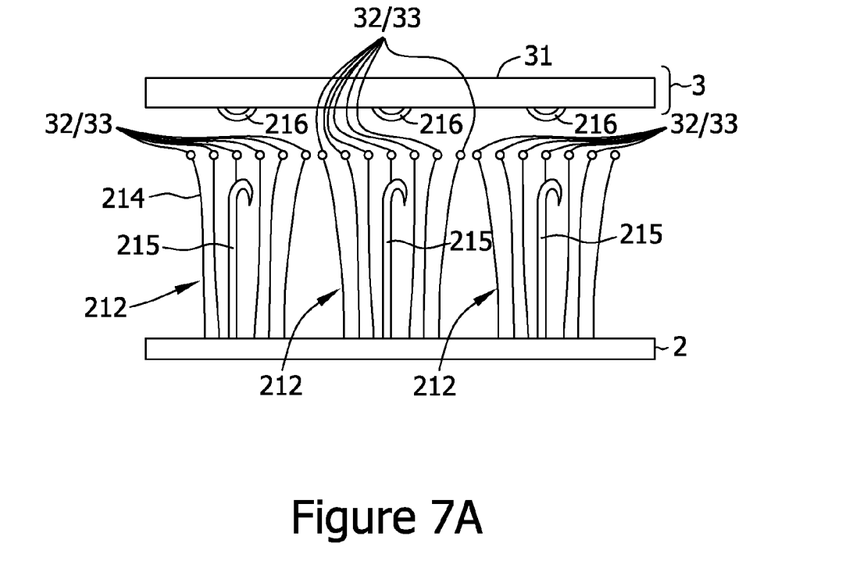
FIG. 7A is a side sectional view of an integrated fuel cell using hooks and loops.
Figure 7B:
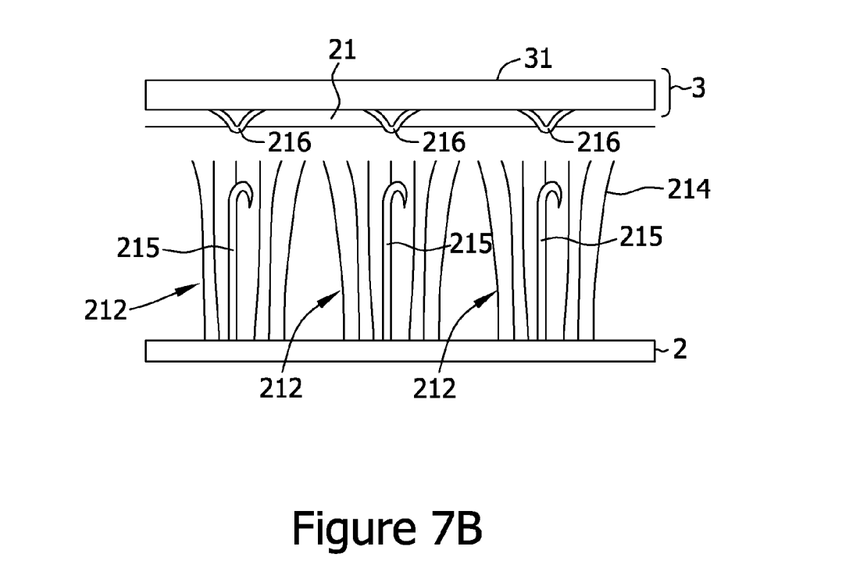
FIG. 7B is a side sectional view of an alternative embodiment of an integrated fuel cell using hooks and loops.

Referring to FIGS. 7A and 7B, another way to integrate bipolar plate 2 and MEA 3 may be based on hook and loop fasteners similar to the well known textile under brand name Velcro®. For this application the hooks 215 and loops 216 can be made of electrically conductive or non conductive fibers 214 embedded into corresponding surfaces. For example, the hooks 215 may be integrated into bipolar plates 2 and loops 216 into the membrane 31 of the MEA 3. Flat parts of a hook may be anchored to the main body of bipolar plate 2, having a hook itself intermingled with fibers in brush 212. On the other hand, loops (not shown) are formed as a part of the membrane 31 or a catalyst layer 21. In operation, the hooks 215 in bipolar plate 2 grip to loops in membrane 31 or catalyst layer 21 placing the fiber brushes 212 into electrical contact with the MEA 3. Typically hooks and loops can be incorporated into a corresponding fuel cell component during its manufacturing.

Aspects of the present invention include an advanced electro catalyst deposition method that allows a lower amount of catalyst to be used in MEAs without degrading the fuel cell performance and durability. In this novel approach, the high surface area metal catalyst is located at the tips of the fibers and thus has a direct contact with the gas, electron and proton reaction interface that is determined with the bipolar plate fibers and membrane surface. In addition, the metal catalyst gradually penetrates into the membrane subsurface creating a diffusion barrier layer within the membrane that inhibits the catalyst degradation by dissolution and recrystallization within the membrane. In addition, this approach of catalyst integration into the membrane allows the usage of less noble or non noble metals for cathode and anode catalysts. Another novelty used in aspects of the invention is that the metal catalyst is chemically bonded to its support, an approach that allows creating very high area catalyst that is not prone to degradation by dissolution, or coalescence. Thus even atomic size catalyst 321 layer or nanosized individual particles are expected to be stable in this embodiment.

Figure 8:
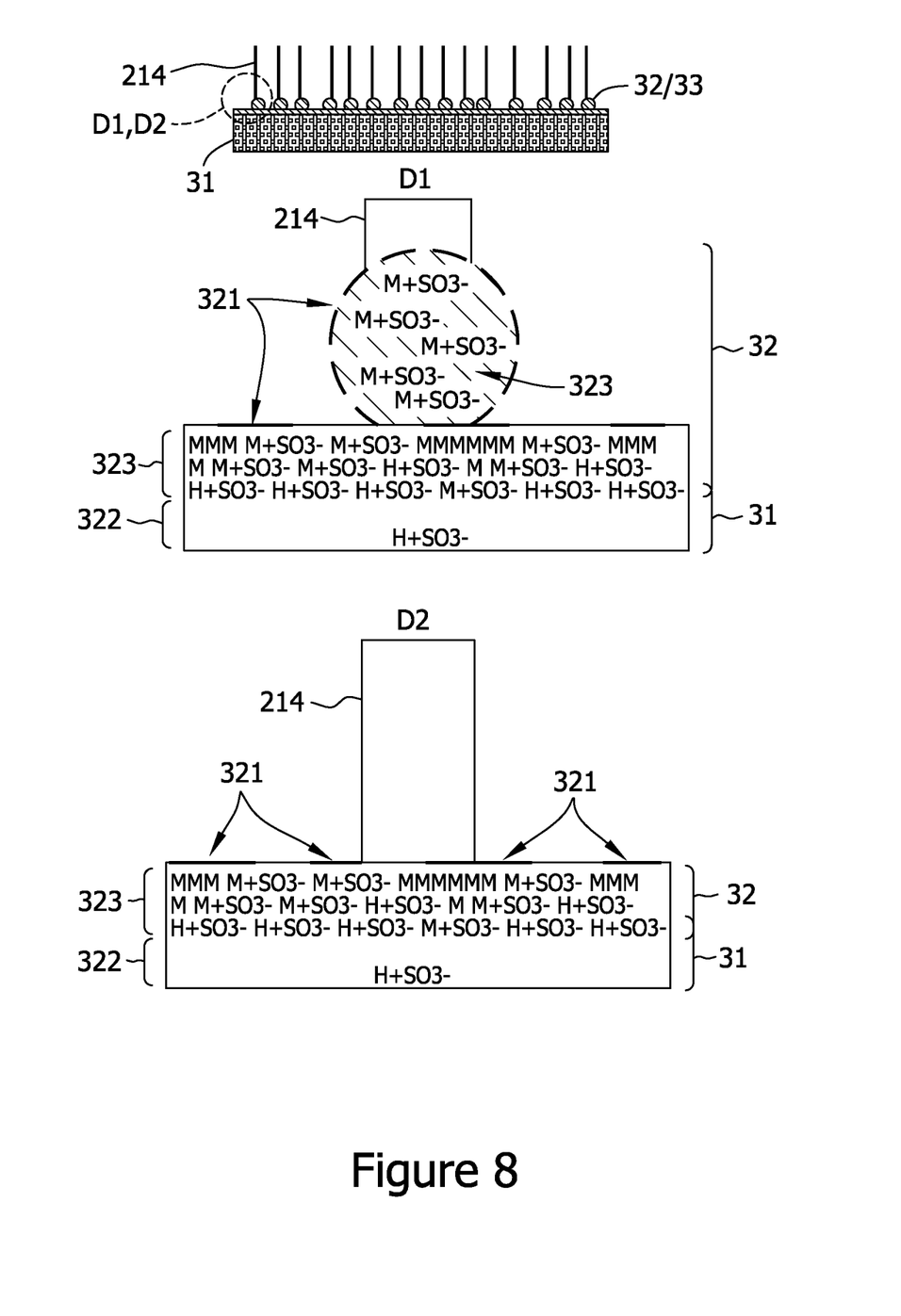
FIG. 8 is an exploded view of bipolar plate fiber-catalyst-membrane integration configuration via: a) catalyst particle deposition on fiber tips; b) catalyst layer.

As best shown in FIG. 8, anode 32 or cathode 33 catalyst layer is operably connected to both the fibers 214 of bipolar plate 2 and membrane 31 surface. For example, anode catalyst layer 32 is in direct contact with proton exchange polymer 322 and electronic conductor fibers 214. The catalyst layer includes metal catalyst 321, and catalyst support 323. The metal catalyst 321 is deposited over the surface of the catalyst support 323.

Various ways of catalyst deposition may be employed to integrate fibers 214, catalyst 321, and membrane 31. For instance, the solution of the ion exchange polymer 322 in protonic form can be deposited onto the tips of fibers 214. Due to surface tension, the polymer will form droplets and after drying spherical particles on the fiber 214 tips. In the next step protons in polymer 322 beads will be exchanged with the catalyst 321 cations in a water solution of the soluble catalyst salt. The ion exchange process forms the catalyst support 323 that is the ion exchange polymer 322 in a salt form. This step is followed by the reduction of the catalyst 321 cations located on the surface of the spherical beads resulting in catalyst metal deposition on the surface of the support 323 that is a salt form of the polymer 322.

Using similar procedure the membrane surface sublayer may also be catalyzed. The proton exchange polymer 322 sublayers convert into a salt form as catalyst support 323. For example, once the polymer droplets are dried on the fiber 214 tips, a thin continuous layer of the polymer 322 is deposited over the polymer beads. Ion exchange and reduction are then done simultaneously on the polymer beads and the film surface in contact with the beads. The thickness and the shape of the catalyst 321 may be manipulated by the reaction conditions such as concentration, temperature, and time. In summary, referring to FIG. 8, the procedure for bipolar plate and MEA integration may include steps:

1) deposition of proton exchange polymer 322 droplets on the tip of bipolar plate fibers 214
2) drying droplets to get polymer spheres (beads)

3) deposition of a continuous thin polymer 322 layer over polymer spheres 4) exchange of protons in polymer 322 spheres and continuous layer with catalyst 321 cations to obtain catalyst support 323

5) reduction of surface cations to metal catalyst 321 on catalyst support 323

6) deposition of polymer 322 to build proton conductive membrane layers.

The same procedure can be used for depositing the cathode catalyst layer 321. Two half cells (anode and cathode) may be then integrated into a single cell by bonding the membrane layers to each other during the membrane deposition process. Step 1) can be skipped in some embodiments where the integration of the bipolar plate, catalyst, and membrane can be achieved by other means as shown in FIG. 7b. For instance, when fiber loops are deposited on the membrane surfaces and hooks are integrated within brush 212 the integration is accomplished by hook and loop mechanism. In this case the fiber loops are deposited on the membrane surface first and than the catalyst layer 321 following the steps 2-6. In another embodiment when the number of fiber tips per unit area is very high such as in the case of nano fibers, adhesion of fibers to the catalyst layer 321 may be strong enough to integrate bipolar plate and MEA. In this embodiment the catalyst layer is deposited directly onto membrane using steps 2-6. The catalyst used may include but it is not limited to pure metals, metal alloys, or metal complexes that are deposed as thin layers (mono atomic to nano size), or as particles (nano to micro size). It can be precipitated onto the proton conducting polymers from various solutions that do not affect the polymer or other fuel cell components. The catalyst layer 321 present on the membrane surface may also be added by non solvent thin film techniques such as PVD or CVD.

Figure 9:
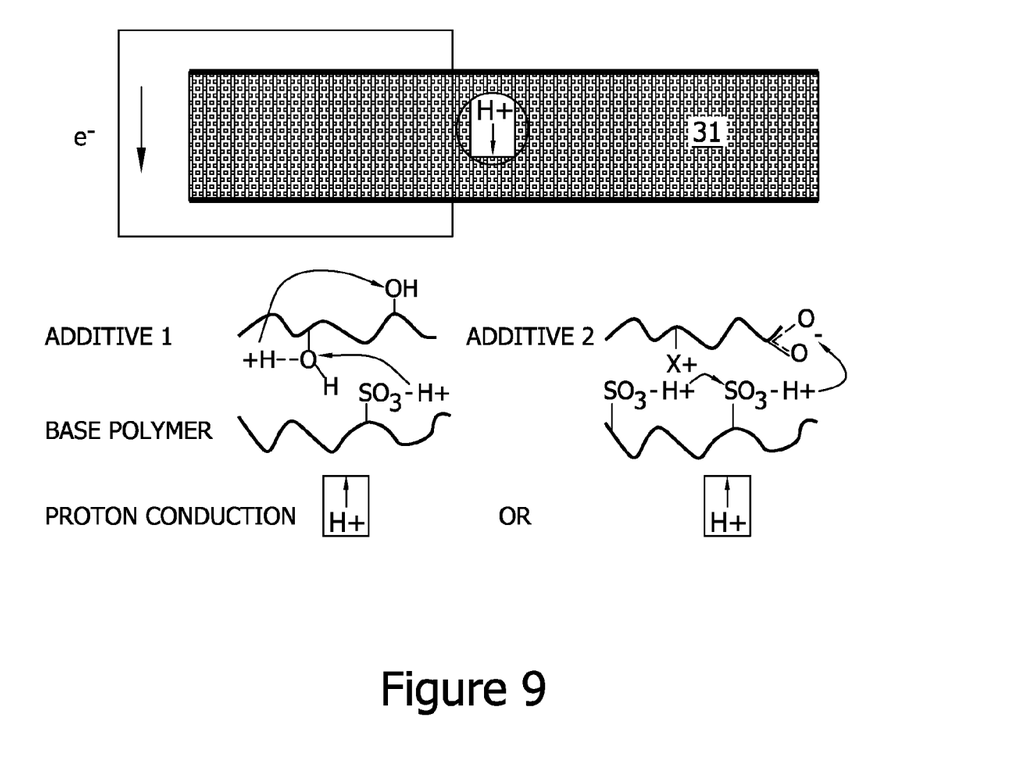
FIG. 9 shows schematics of the possible proton transfer mechanism through two different types of polymer electrolyte membrane.

According to another aspect of the invention, new material chemistry is used as a base for non liquid based proton conduction at low and high operating temperatures. As shown in FIG. 9, membrane 31 may be prepared as a blend of intrinsic proton donors such as acidified polymers and immobilized proton solvents such as organic or inorganic polyols, or oxygen and nitrogen containing macromolecules. The chemical structure enables intermolecular proton transfer within hydrogen bond network formed between proton donor and proton acceptor molecules. For instance, protons from a sulfonic group of a sulfonated polymer and hydroxyl groups from additive 1 create a hydrogen bond network similarly to what exists in Nafion® in the presence of liquid water; however, the proton conductivity in this material is water independent. In another example presented in FIG. 9 for the material blend that includes sulfonated polymer and ampholyte additive 2 an anhydrous proton conduction occurs through the membrane via hydrogen bonding as in an acid like solution with a certain pH. To make bulk polymer blends used for fabrication of membranes 31, homogenization of the polymer solid, liquid, or liquefied precursors can be performed by various ways of mixing. The produced bulk polymer is then shaped into membrane 31 via any polymer processing method known in the art that may include but is not limited to molding, casting, and extrusion. However, thin membrane 31 films may be produced from polymer solutions using dip coating, spin coating, or spraying techniques. In addition thin membrane 31 films with organized nanostructure may be produced using layer by layer (LBL) method. This method allows producing multilayer membrane 31 from proton donor and proton acceptor compounds used. The final membrane structure is obtained through the consecutive deposition of individual nanolayers of each compound. Choosing deposition conditions, the nanostructure of the membrane 31 can be altered to get desired membrane characteristics. Any sulfonated, carboxylated, or phosphonated polymer may be used as a proton donor material. On the other hand, conjugate proton acceptor base used may include but are not limited to polyhydroxyl alcohols, polymeric metal hydroxides, quaternary ammonium cation macromolecules, or nitrogen containing polymer.

To prevent gas crossover and external leak from the integrated single fuel cell 1, the perimeter of the cell is sealed as shown in FIG. 1. The membrane 31 and bipolar plate 2 perimeters are fused together creating fuel cell seal 4 during the cell integration or after it is completed. The seal 4 is made of the same material as the base material 241 of the flat plate 24 (FIG. 2). However, other materials compatible with both flat plate 24 and membrane 31 may also be used. The seal 4 can be injection molded, or cast in fuel cell creating butt joints with bipolar plates 2 and T joint with the membrane 31. In the case that the membrane 31 perimeter exceeds the active area, the seal 4 and membrane 31 may be fused via butt joint as well. Once in place the seal 4 allows to proceed with stack assembly that may include only addition of current collector plates 6 (FIG. 10) to single cell 1, or the assembly of multiple cells 1 with current collector plates 6.

Integrated single cell 1 may be stacked in various manners to get a multiple fuel cell stack with a higher power output. A two cell fuel cell stack 7 with internal manifolding (i.e., inlets and outlets) 5 and cooling 9 is presented in FIG. 10. Two integrated cells 1 shown in FIG. 10 are an example that illustrates a bipolar fuel cell arrangement that may be repeated as many times as required to get the voltage-power stack output. Referring to FIG. 10, a common bipolar plate 2 shared between two adjacent cells 1 is used to integrate individual cells 1 into multiple stacks. The integration occurs through the same iterations as presented in the procedure for integration of single cells 1. Depending which side of MEA the flow field faces, anode or cathode catalyst layer is deposited on the tips of the fibers 214 of the flow field 221 facing MEA. After catalyst 321 deposition the membrane polymer 322 is partially deposited on it to make half cell. Similarly, the second half cell is deposited on the external flow field of the next adjacent single cell and used to integrate the cells into a multiple stack through the membrane 31 fusion. The integration of the last cells in multiple stack occurs on the same way, however the catalyst is deposited onto the fiber flow field 221 of an end plate 10. The sealing of the fuel cells assembled during stack integration is done on the same way as in the single cells 1. To complete the stack assembly, anode (+) and cathode (−) current collector plates 6 are attached to the end plates 10 as shown in FIG. 10. The end plates 10 are designed to conduct current and support the inlets and outlets of the fluids supplied to and exhausted from the stack. The current collector plates 6 may consist of two components: electrically conductive plate 61 and insulator plate 62. The conductive plates 61 are in electrical contact with the fibers of the anode and cathode end plates 10. The conductive plates 61 may have extensions coming out of the insulator plate 62 to attach wiring. Typically they are made of electrically conductive metals or metal alloys. Preferably the conductive plates 61 are made of thin metal foils to decrease the weight and volume of stack. The insulator plates 62 support the current collectors plates 6 and reactant gas ports 5 and coolant ports 8. Preferably this insulator plate 62 is made of the same base material 241 used for the fiber encapsulation. It can be attached to the stack by manufacturing process used for fabrication of polymers or polymer based composites. When fuel cell is in operation, the hydrogen gas approaches anode catalyst while oxygen approaches the cathode catalyst of the MEA 3. Protons formed on the anode catalyst 32 are conducted through the proton exchange membrane 31 to the cathode catalyst 33 where they combine with the reduced oxygen and generate water, electrical current and heat. Hydrogen coming into the fuel cell 1 is distributed through the flow field 221 across the MEA 3 anode catalyst 32. The hydrogen flow may be trough flow, or dead ended with the periodic purge since the hydrogen exhaust contains mostly water vapor. The transfer of oxidant may occur via convection through the open cathode structure. The cell 1 may operate in wide range of temperature, pressure, relative humidity, and flow rates due to the compatibility of materials used to make the cell.

Integrated single cell 1 may be stacked in various manners to get a multiple fuel cell stack with a higher power output. A two cell fuel cell stack 7 with internal manifolding 5 and cooling 9 is presented in FIG. 10. Two integrated cells 1 shown in FIG. 1 are an example that illustrates a bipolar fuel cell arrangement that may be repeated as many times as required to get the voltage-power stack output. Referring to FIG. 10, a common bipolar plate 2 shared between two adjacent cells 1 is used to integrate individual cells 2 into multiple stacks. The integration occurs through the same iterations as presented in the procedure for integration of single cells 1. Depending which side of MEA the flow field faces, anode or cathode catalyst layer is deposited on the tips of the fibers 214 of the flow field 241 facing MEA. After catalyst 321 deposition the membrane polymer 322 is partially deposited on it to make half cell. Similarly, the second half cell is deposited on the external flow field of the next adjacent single cell and used to integrate the cells into a multiple stack through the membrane 31 fusion. The integration of the last cells in multiple stack occurs on the same way, however the catalyst is deposited onto the fiber flow field 24 of an end plate 10. The sealing of the fuel cells assembled during stack integration is done on the same way as in the single cells 1. To complete the stack assembly, anode (+) and cathode (−) current collector plates 6 are attached to the end plates 10 as shown in FIG. 10. The plates 10 are designed to conduct current and support the inlets and outlets of the fluids supplied to and exhausted from the stack. The current collector plates 6 may consist of two components: electrically conductive plate 61 and insulator plate 62. The plates 61 are in electrical contact with the fibers of the anode and cathode end plates 10. They may have extensions coming out of the insulator 62 to attach wiring. Typically they are made of electrically conductive metals or metal alloys. Preferably the plates 6 are made of thin metal foils to decrease the weight and volume of stack. The insulator plates 62 support the current collectors 61 and reactant gas 5 and coolant 8 ports. Preferably this layer 62 is made of the same base material 241 used for the fiber encapsulation. It can be attached to the stack by manufacturing process used for fabrication of polymers or polymer based composites. When fuel cell is in operation, the hydrogen gas approaches anode catalyst while oxygen approaches the cathode catalyst of the MEA 3. Protons formed on the anode catalyst 32 are conducted through the proton exchange membrane 31 to the cathode catalyst 33 where they combine with the reduced oxygen and generate water, electrical current and heat. Hydrogen coming into the fuel cell 1 is distributed through the flow field 241 across the MEA 3 anode surface 32. The hydrogen flow may be trough flow, or dead ended with the periodic purge since the hydrogen exhaust contains mostly water vapor. The transfer of oxidant may occur via convection through the open cathode structure. The cell 1 may operate in wide range of temperature, pressure, relative humidity, and flow rates due to the compatibility of materials used to make the cell.

Although details of exemplary and preferred embodiments according to aspects of the invention are disclosed, it should be understood that the invention is not limited by such details. Rather, the scope of the invention should be determined by the following claims.

I claim:

1. An integrated PEM fuel cell, comprising:
   at least two bipolar plate assemblies, each including:
      a gas impermeable plate and
      multiple unidirectional electrically conductive fibers, each fiber having anode fiber ends and cathode fiber ends,
      the fibers being grouped in longitudinal bundles extending perpendicular to the plate,
      the anode fiber ends on one side of the plate and the cathode fiber ends on the other side of the plate,
      each of the fibers being coated in a gas impermeable coating, the coating extending from the plate towards each of the fiber ends, a portion of the fibers adjacent the fiber ends remaining uncoated,
      the fiber end portions transitioning to uncoated fiber brushes presenting fiber tips, wherein the uncoated fiber brushes comprise micro channels that increase in diameter from the portion of the fibers adjacent the fiber ends towards the fiber tips;
      the anode side of one of the bipolar plate assemblies facing the cathode side of the other bipolar plate assembly;
   a membrane electrode assembly, including:
      an anode catalyst support located on fiber tips of the anode fiber ends and an anode catalyst located on the anode catalyst support;
      a cathode catalyst support located on fiber tips of the cathode fiber ends and a cathode catalyst located on the cathode catalyst support; and
   a proton exchange membrane interconnecting the cathode catalyst support and the anode catalyst support.

2. The fuel cell according to claim 1, wherein the anode catalyst support and the cathode catalyst support are each an ion exchange polymer.

3. The fuel cell according to claim 2, wherein the anode catalyst support and the cathode catalyst support are each in the form of droplets or a coating on the fiber ends.

4. The fuel cell according to claim 3, wherein the proton exchange membrane is formed as a ion exchange polymer placed on the catalyst support on the fiber ends.

5. The fuel cell of claim 1, wherein the bundles are arranged in a matrix to define a fuel flow field on one side of the plate and an oxidant flow field on the other side of the plate.

6. The fuel cell of claim 1, further comprising collector plate assemblies, including a conductive plate for electrically connecting to an anode end of one of the bipolar plate assemblies; and a second conductive plate for electrically connecting to a cathode end of another of the bipolar plate assemblies.

7. The fuel cell of claim 1, wherein the plates are constructed of conductive resin.

8. The fuel cell of claim 1, wherein the fiber bundles of each bipolar plate assembly are intersected by and connected to an electrically conductive substrate positioned within the bipolar plate.

9. The fuel cell of claim 8, wherein the fibers extending through each bipolar plate are separated by the substrate into anode fibers and cathode fibers.

10. The fuel cell of claim 8, wherein the substrate extends beyond the periphery of the bipolar plate.

11. An integrated PEM fuel cell, comprising:
    at least two bipolar plate assemblies, each including:
        a gas impermeable plate;
        multiple electrically conductive fibers arranged in fiber bundles, including anode fibers extending from the plate on an anode side and cathode fibers extending from the plate on an opposite cathode side, said anode fibers and said cathode fibers being electrically connected,
        each of said anode fibers and cathode fibers presenting fiber end portions transitioning to uncoated fiber brushes presenting fiber tips, wherein the uncoated fiber brushes comprise micro channels that increase in diameter from the portion of the fibers adjacent the fiber ends towards the fiber tips;
        the anode side of one of the bipolar plate assemblies facing the cathode side of another bipolar plate assembly;
    a membrane electrode assembly, including:
        an anode catalyst support located on fiber tips of the anode fiber ends and an anode catalyst located on the anode catalyst support;
        a cathode catalyst support located on fiber tips of the cathode fiber ends and a cathode catalyst located on the cathode catalyst support; and
        a proton exchange membrane interconnecting the cathode catalyst support and the anode catalyst support.

12. The fuel cell of claim 11, wherein the fibers are formed as fiber blocks including continuous fiber in an adhesive matrix making the block impermeable.

13. The fuel cell of claim 12, wherein the fiber blocks are arranged to form flow paths for at least one of fuel and oxidant.

14. The fuel cell of claim 11, wherein the fibers in the fiber blocks are arranged in a woven fabric.

15. The fuel cell of claim 1, further comprising fibers shaped as hooks extending from each bipolar plate assembly and fibers arranged as loops incorporated in each membrane electrode assembly, said fiber hooks and fiber loops interconnecting.

16. A bipolar plate assembly for a fuel cell, comprising:
    a gas impermeable plate and
    multiple unidirectional electrically conductive fibers, each fiber having a first anode end and a second cathode end,
        the fibers being grouped in longitudinal bundles extending perpendicular to the plate,
        the anode ends on one side of the plate and the cathode ends on the other side of the plate,
        each of the fibers being coated in a gas impermeable coating, the coating extending from the plate towards each of the fiber ends, a portion of the fibers adjacent the ends remaining uncoated, and
        the fiber end portions transitioning to uncoated fiber brushes presenting fiber tips, wherein the uncoated fiber brushes comprise micro channels that increase in diameter from the portion of the fibers adjacent the fiber ends towards the fiber tips.

17. A membrane electrode assembly for a fuel cell, said assembly comprising:
    multiple anode fiber ends and multiple cathode fiber ends facing each other;
    the fiber ends transitioning to fiber brushes presenting fiber tips, wherein the uncoated fiber brushes comprise micro channels that increase in diameter from the portion of the fibers adjacent the fiber ends towards the fiber tips;
    an anode catalyst support located on fiber tips of the anode fiber ends and an anode catalyst located on the anode catalyst support;
    a cathode catalyst support located on fiber tips of the cathode fiber ends and a cathode catalyst located on the cathode catalyst support; and
    a proton exchange membrane interconnecting the cathode catalyst support and the anode catalyst support.

\* \* \* \* \*